United States Patent [19]

Krebsbach

[11] Patent Number: 5,106,239
[45] Date of Patent: Apr. 21, 1992

[54] PRECISION POWDER HOPPER
[75] Inventor: John Krebsbach, Appleton, Wis.
[73] Assignee: Miller Thermal, Inc., Appleton, Wis.
[21] Appl. No.: 627,407
[22] Filed: Dec. 14, 1990
[51] Int. Cl.$^5$ ............................................. B65G 53/40
[52] U.S. Cl. ........................................ 406/63; 406/62;
406/66; 406/73; 222/252; 222/349; 222/370;
222/636
[58] Field of Search ....................... 406/62, 63, 66, 67,
406/73; 222/636, 349, 370, 252; 198/533

[56]  References Cited
U.S. PATENT DOCUMENTS

| | | | |
|---|---|---|---|
| 3,517,861 | 6/1970 | De la Vega | 406/63 |
| 4,789,569 | 12/1988 | Douche et al. | 406/63 X |
| 4,808,042 | 2/1989 | Muehlberger et al. | 406/66 |
| 4,997,318 | 3/1991 | Kostecki et al. | 406/67 X |

Primary Examiner—Margaret A. Focarino
Assistant Examiner—James M. Kannofsky
Attorney, Agent, or Firm—Donald Cayen

[57]  ABSTRACT

A precision powder hopper comprises a canister for storing particulate material and a rotatable carrier wheel that accurately meters small amounts of the material to a powder out port. The carrier wheel has slots therethough that receive definite quantities of material, which is tamped into the carrier wheel slots by a tamper assembly. The tamper assembly includes a deflectable leaf spring that mounts to the same shaft that rotates the powder carrier wheel. A cam and spoke arrangement cause the leaf spring to deflect cyclically in response to rotation of the powder carrier wheel. A cupped spring washer cooperates with the leaf spring to absorb some of the deflection thereof, thereby decreasing the bending stress in the leaf spring and increasing its service life. Powder in the carrier wheel slots is wiped by a novel seal that has at least one circular line contact with the carrier wheel. The circular line is created by the intersection of a frusto-conical surface and a bottom surface of a first seal lip that is pressed against the carrier wheel. A second circular line contact between a second seal lip and the carrier wheel may be created by pressing the carrier wheel against the intersection of the bottom surface and outer frusto-conical surface of the second seal lip.

12 Claims, 5 Drawing Sheets

PRECISION POWDER HOPPER

BACKGROUND OF THE INVENTION

1. Field of the Invention

This invention pertains to material handling, and more particularly to apparatus for feeding granular particles.

2. Description of the Prior Art

Various equipment has been developed to feed small amounts of particulate material from a storage container to a point of use. Thermal spray products such as flame spray and plasma spray equipment constitute an important application of particulate feeders. In such equipment, small amounts of metallic or ceramic powder are accurately metered from a hopper to a powder out port. From the powder out port, the powder is entrained in a gaseous stream for transportation to a thermal spray plasma or combustion gun. Examples of prior powder hoppers may be seen in U.S. Pat. Nos. 3,517,861; 3,909,068; 4,808,042; and Great Britain Patent Application 2,177,335A.

In the devices of the foregoing patents, a powder carrier wheel having accurately sized pockets or cavities rotates within a hopper. The wheel cavities receive definite volumes of powder from a large quantity in the hopper. Carrier wheel rotation carries the powder in the wheel cavities to a discharge location, where the powder is entrained in a gaseous stream for transportation to a spray gun. The rate of powder feeding is governed by the rotational speed of the carrier wheel and the size of the holes in the carrier wheel.

To assure that only the amount of powder that is containable within the wheel pockets or cavities is actually carried by the wheel to the discharge location, that is, that there is not a heap on the pocket or cavity, some prior hoppers employ leveling or smoothing devices. For example, the powder feeder of the U.S. Pat. No. 3,909,068 includes a wiper appended on a gasket for leveling the powder in the carrier wheel cavity. In the hopper of the U.S. Pat. No. 4,808,042, the carrier wheel cavities pass under a portion of the hopper wall, which scrapes away excess powder.

FIGS. 1 and 2 show an improved design of the powder hopper of the U.S. Pat. No. 3,517,861. The improvement consists of the addition of a seal 1 installed in a hopper housing 5 proximate a rotating powder carrier wheel 3. The seal 1 has a lip 6 with a planar bottom surface 10 that rubs on the top surface 8 of the wheel 3 as the wheel is rotated by a shaft 4. The seal lip 6 accurately levels the powder within a metering cavity 7 before the cavity and powder contained therein approach a powder out port 9. (For clarity the powder out port 9 is shown 90 degrees out of position.)

A characteristic of thermal spray powders is their extreme hardness and abrasiveness. Consequently, the powders tend to wear the hopper components that level the powder in the metering cavity. For instance, the gaskets of the U.S. Pat. No. 3,909,068 wear during use such that the housings that hold the gaskets must be periodically repositioned. With the seal 1 of FIGS. 1 and 2, some powder particles inevitably creep into voids between the lip bottom surface 10 and the carrier wheel top surface 8. The abrasiveness of the powder eventually wears the lip bottom surface 10 such that it does not properly prevent powder from passing under it and to the powder out port 9. In many cases the seal wears to such an extent that a gap is created between the lip bottom surface 10 and the carrier wheel top surface 8. As a result, the accuracy of the wheel metering system is degraded. Another detrimental effect of seal wear is that the powder gas can siphon powder from the hopper through the gap between the seal surface 10 and the powder carrier wheel 3 to the powder out port 9. Consequently, the powder feed rate is subject to considerable additional variation that is dependent on seal condition. In some applications, the service life of the seal 1 is between approximately 10 and 50 hours, depending on the particular powder being metered.

To assure accurate filling and discharge of the powder by a carrier wheel or similar metering device, it is known to utilize powder tampers. Powder tampers are especially useful to assist feeding low density or extremely fine powders that have a tendency to bridge or clog. U.S. Pat. Nos. 4,808,042 and 3,517,861 describe representative powder tampers. FIGS. 3 and 4 depict a tamper assembly that may be utilized with the hopper and seal design of FIGS. 1 and 2. Rotation of a cam wheel 11 causes spokes 13 extending radially from the cam wheel periphery to strike a lift cam 15. The lift cam 15 is joined to a leaf spring 17. In turn, the leaf spring 17 is captured between a washer 19 and a shoulder 21, which are retained by a thumb screw 22 on a post 23 that is connected to the shaft 4 of FIG. 1. The leaf spring has a central hole 24 for locating on the post 23. To the end of the leaf spring 17 is mounted a tamper bar 25 that is aligned with the carrier wheel cavities 7, FIG. 1. As the cam wheel 11 rotates, the spokes 13 strike the lift cam 15 to bend the leaf spring 17 in the region of the hole 24, such that the leaf spring deflects to the phantom position 17', thus raising the tamper bar 25. As a spoke 13 passes the lift cam, the lift cam is released, and the resilient nature of the leaf spring material snaps the leaf spring and tamper bar back to their undeflected positions of FIG. 4. Consequently, any powder under the tamper bar 25 is tamed into the wheel cavity 7.

The bending stress on the leaf spring 17 is heavily concentrated at the outer diameter of the washer 19. That stress concentration, the continuous flexing of the leaf spring, and the rigid construction of the washer 19, shoulder 21, knob 22, and post 23 cause the spring to wear undesirably quickly around the margins of the hole 24.

Thus, a need exists for improvements in powder hoppers.

SUMMARY OF THE INVENTION

In accordance with the present invention, a precision powder hopper is provided that incorporates components having longer service lives than are utilized in prior powder hoppers. This is accomplished by apparatus that includes a novel powder wiping seal and a shock absorbing tamper assembly.

The seal of the present invention is generally annular in shape about a longitudinal axis, and it preferably is made of a polyurethane material. The seal has first and second lips, at least one of which makes a circular line contact with a powder carrier wheel. The first lip is integral with a seal body section. The second lip extends from the first lip and on the opposite side thereof as the body section.

The seal body section preferably has a generally rectangular cross section with an inner diameter, an outer diameter, and opposed top and bottom surfaces. The first lip preferably has a generally parallelogram cross section, with inner and outer frusto-conical surfaces that may be parallel to each other. The inner frusto conical surface intersects the body section inner diameter, and the first lip outer frusto-conical surface intersects the body section bottom surface. The first lip is further defined by a top plane that is coincident with the body section bottom surface, and by a bottom surface that is generally parallel to the top plane.

The second lip of the seal is also preferably in the form of a parallelogram cross section with inner and outer frusto-conical surfaces. The second lip inner frusto-conical surface is coplanar with the first lip inner frusto-conical surface. The second lip outer frusto-conical surface intersects the bottom surface of the first lip. A top plane coincident with the bottom surface of the first lip forms the third side of the second lip. The second lip terminates in a bottom surface. The plane of the bottom surface of the second lip need not be perpendicular to the longitudinal axis of the seal. Rather, the second lip bottom surface may be in the form of a shallow frusto-conical surface that converges toward the seal body section.

The dimensions of the relevant powder hopper components are chosen such that when the seal of the present invention is installed, it is pressed against the powder carrier wheel to form at least one circular line contact with the carrier wheel. The circular line contact on the seal is located at the junction of the outer frusto-conical surface and the bottom surface of the second lip.

In some applications, it may be desirable to have a second circular line contact between the seal and the carrier wheel. In those situations, the seal is pressed against the carrier wheel an additional amount such that the first lip deflects to enable the junction of the outer frusto-conical surface and bottom surface thereof to contact the carrier wheel. Both the single and the double line contact provide greatly improved sealing characteristics compared with prior powder leveling seals. Further, the siphoning of powder from the hopper past the seal to the powder out port is greatly reduced and often even eliminated.

Further in accordance with the present invention, the shock absorbing tamper assembly comprises a resilient member in conjunction with the mounting of a leaf spring to the powder carrier wheel. The leaf spring has a hole therethrough that fits over a post concentric with the carrier wheel. The leaf spring is sandwiched between a post shoulder and a washer. The washer, in turn, is captured in place on the post by a thumb screw. The resilient member, which may be a cup spring washer, is interposed between the washer and the thumb screw. As a consequence, a gap is formed by the cup spring washer between the thumb screw and the washer, and the cup spring washer creates a semi-rigid body against the leaf spring.

The leaf spring deflects cyclically in response to a lifting cam joined thereto being struck by the spokes of a cam wheel that rotates with the powder carrier wheel. The lift cam and spokes cooperate to force the leaf spring to bend. Because of the presence of the cup spring washer and attendant gap between the washer and the thumb screw, the bending force on the leaf spring is spread more evenly over the washer face area. In addition, the bending force is also applied to the cup spring washer, thus causing it to compress and reduce the amount of leaf spring bending required to produce the deflection induced by the lift cam. As a result, the bending stress of the leaf spring is greatly reduced, and the leaf spring service life is correspondingly increased.

Other advantages, benefits, and features of the invention will become apparent to those skilled in the art upon reading the detailed description of the invention.

DETAILED DESCRIPTION OF THE INVENTION

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Figure 10:
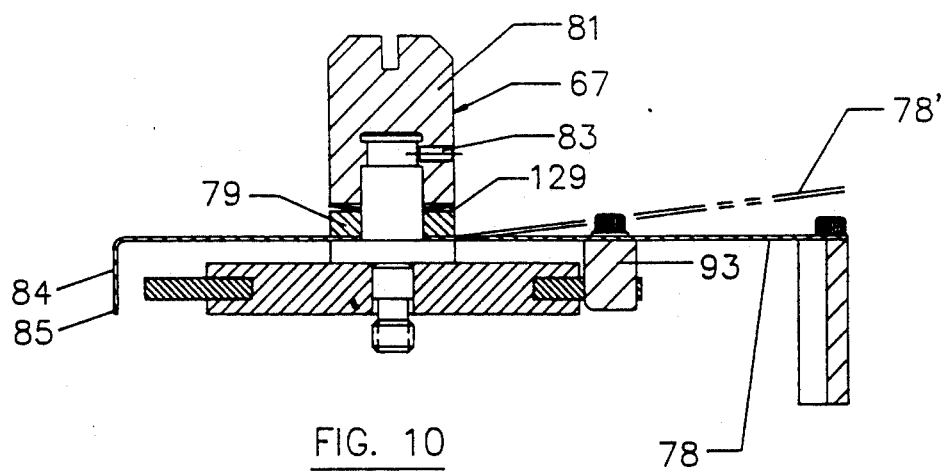
FIG. 10 is a cross sectional view taken along lines 10—10 of FIG. 9.
Figure 5:
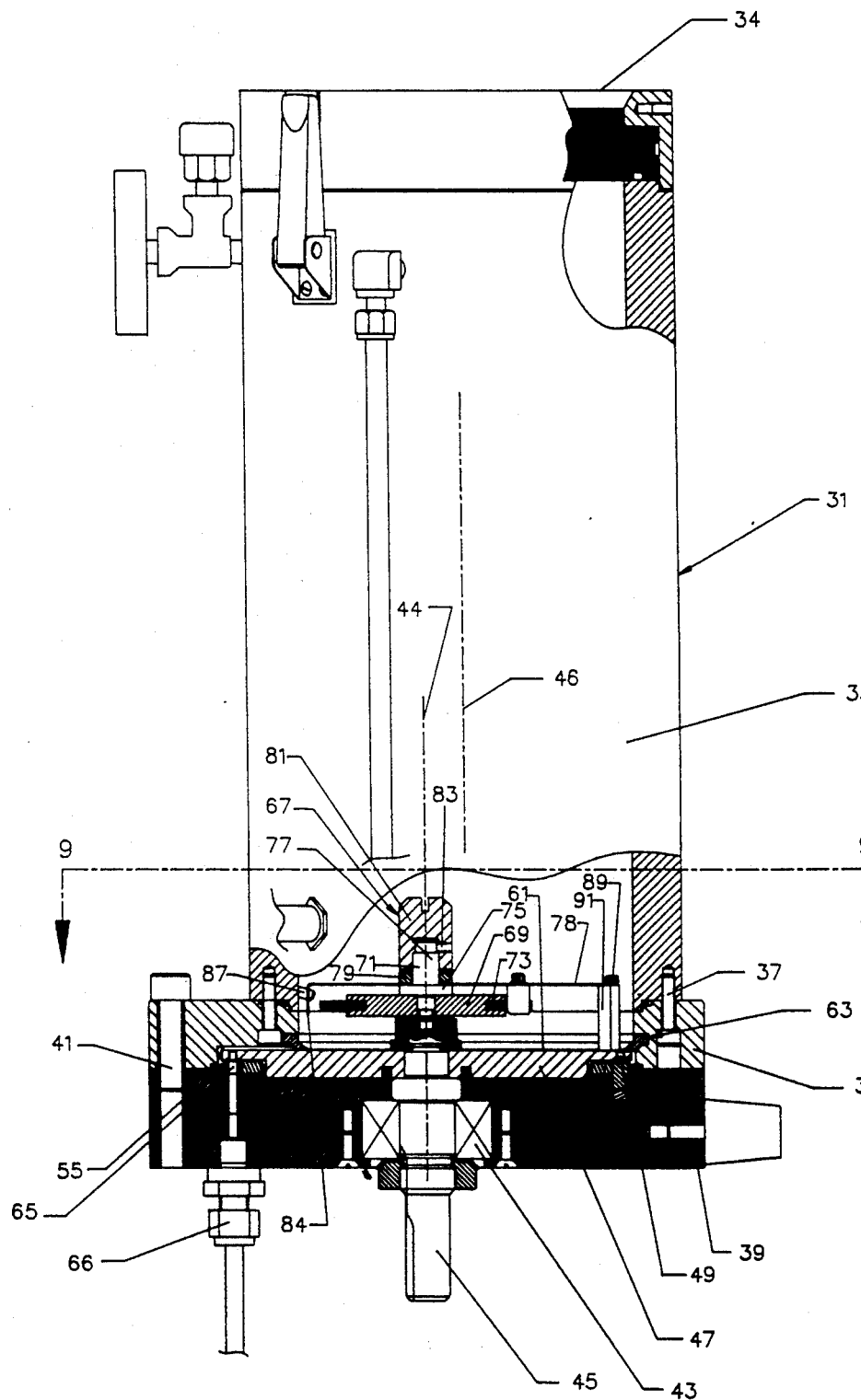
FIG. 5 is a side view, partially in section, of precision powder hopper according to the present invention.
Figure 9:
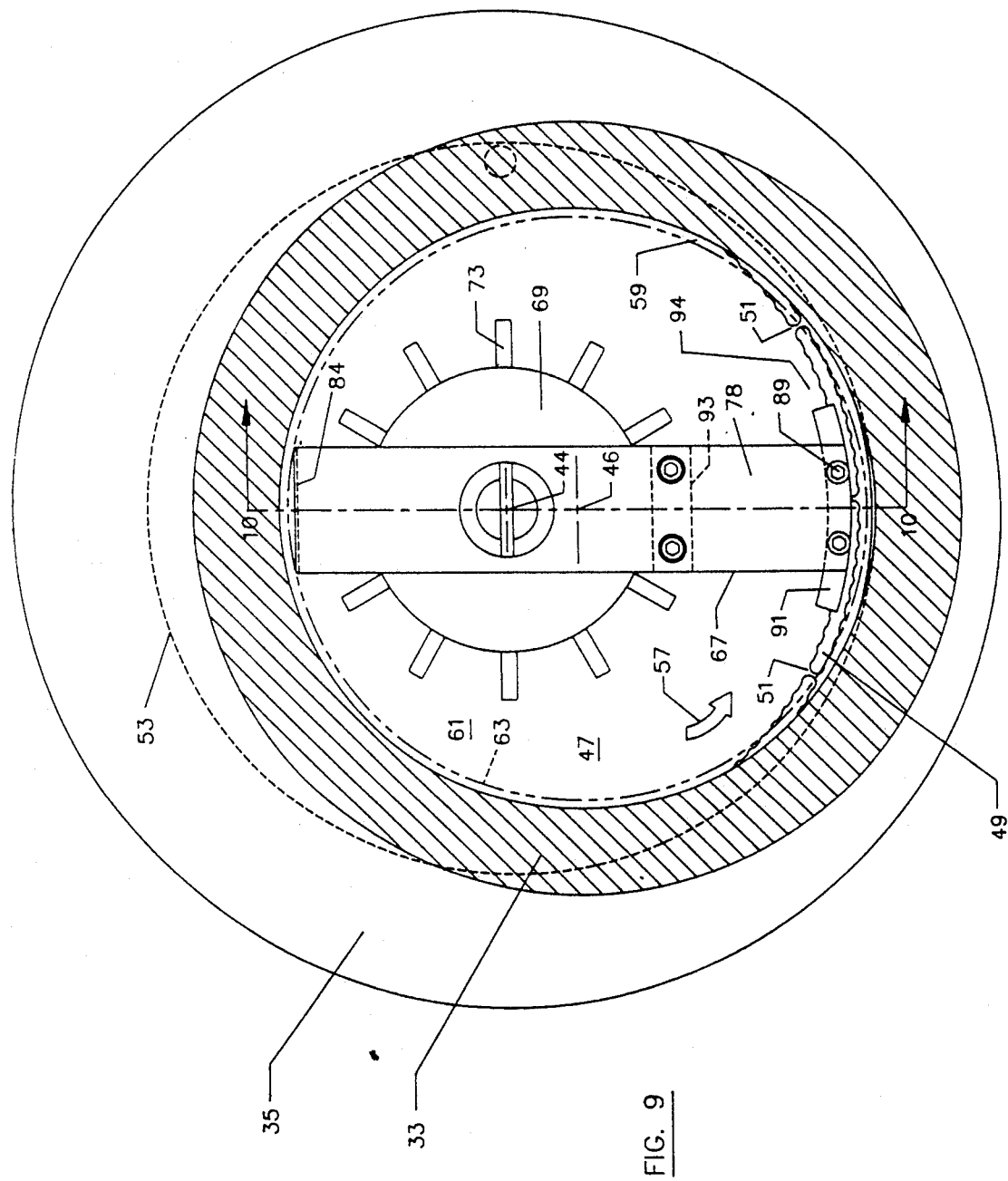
FIG. 9 is an enlarged cross sectional view taken along lines 9—9 of FIG. 5 and rotated 90 degrees clockwise.

Referring to FIGS. 5, 9, and 10, a precision powder hopper 31 is illustrated that includes the present invention. The precision powder hopper is particularly useful for accurately metering small quantities of metallic or ceramic powders to a thermal spray plasma or combustion gun, but it will be understood that the invention is not limited to thermal spray applications.

The powder hopper 31 is comprised of a canister 33 that holds the powder. A known lid assembly 34 provides access to the interior of the canister 33. The canister is fastened to an annular upper housing 35 by screws 37. In turn, the upper housing 35 is attached to a lower housing 39 by screw 41.

Mounted for rotation in the lower housing 39 by means of bearings 43 is a shaft 45. The shaft 45 is driven at a relatively slow speed by a conventional motor and speed reducer, not shown. Connected to the shaft for rotation therewith is a powder carrier wheel 47. The common centerline 44 of the shaft and powder carrier wheel 47 is eccentric to the centerline 46 of the canister 33. A crescent shaped portion 53 of the powder carrier wheel fits within a correspondingly shaped passage 55 between the upper housing 35 and the lower housing 39. Near the periphery of the powder carrier wheel 47 are a series of elongated circumferentially extending slots 49 separated by short lands 51.

As the shaft 45 and powder carrier wheel 47 rotate, powder in the canister 33 falls by gravity into the carrier wheel slots 49 that are within the canister charging area 94. Assuming in FIG. 9 that the powder carrier wheel 47 rotates in the direction of arrow 57, the slots 49 pass into the crescent shape passage 55 in the region of reference numeral 59. In doing so, the powder in the slots is wiped smooth to the level of the carrier wheel top surface 61 by a seal 63, which is partially shown by a phantom line in FIG. 9. The powder in the carrier wheel slots is carried to a powder out port 65 and associated fittings 66. The powder out port 65 is shown 90 degrees out of position in FIG. 5 for clarity. A stream of low pressure inert gas, such as argon, is pumped through the powder out port 65 and fittings 66 to transport the powder through known hoses to a thermal spray gun, as is known in the art. By changing the rotational speed of the shaft and powder carrier wheel or the size of the slots 49, the quantity of powder fed to the powder out port and fittings and thus to the spray gun is controlled.

Figure 3:
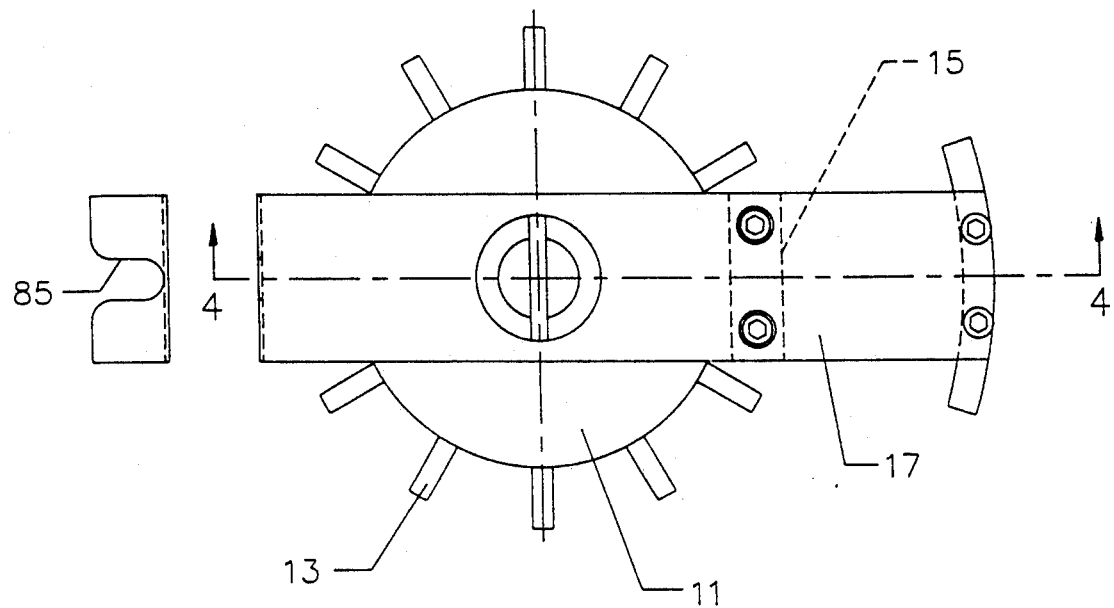
FIG. 3 is a top view of a prior tamper assembly that may be used with the powder hopper of FIG. 1.

To assure accurate metering of the powder in the canister 33 to the powder out port 65, a tamper assembly 67 is employed. The tamper assembly 67 is comprised of a cam wheel 69 connected by means of a post 71 to the shaft 45. Extending radially from the periphery of the cam wheel 69 are a number of spokes 73. The post 71 has a shoulder 75 and a turned down diameter 77. A leaf spring 78 has a hole that fits over the post turned down diameter 77 such that the leaf spring rests on the post shoulder 75. The leaf spring 78 is sandwiched between the post shoulder and a washer 79, which in turn is captured on the post by a thumb screw 81 and set screw 83. One end of the leaf spring has a short tab 84 with a notch 85, (FIG. 3) that fits over a pin 87 inserted into the inner diameter of the canister 33. To the opposite end of the leaf spring is mounted, as by conventional screws 89, a tamper bar 91. The tamper bar 91 is located in general alignment with the powder carrier wheel slots 49 in the charging area 94.

Also joined to the leaf spring 78 is a lift cam 93. The lift cam 93 is located radially from the axis 44 so as to be contacted by the spokes 73 as the cam wheel 69 rotates with the shaft 45. The lift cam is formed with a beveled surface that, when contacted by a rotating spoke, gradually lifts the lift cam, thereby bending the leaf spring about its mounting between the post shoulder 75 and the washer 79 to the deflected position 78'. Bending the leaf spring also raises the tamper bar 91 away from the powder carrier wheel top surface 61. The beveled surface of the lift cam joins to a vertical surface parallel to the axis 44. When the spoke breaks contact with the lift cam beveled surface, the resiliency of the leaf spring material snaps the leaf spring and the tamper bar back to their respective undeflected positions as shown in FIG. 10. As a result, powder within the charging area 94 and located between the deflected tamper bar and the carrier wheel slots 49 is tamped into the slots, thereby assuring that the slots are completely filled.

Figure 6:
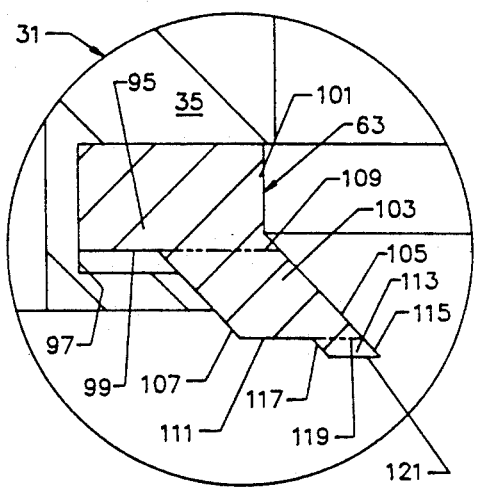
FIG. 6 is an enlarged cross sectional view of the seal of the present invention in a relaxed condition.

In accordance with the present invention, the precision powder hopper 31 is designed such that there is at least one circular line of contact between the top surface 61 of the powder carrier wheel 47 and the seal 63. Turning to FIG. 6, the seal 63 is shown in the relaxed condition. The seal has a longitudinal axis and a concentric annular body section 95 that preferably has a rectangular cross section. The body section 95 is inserted into a groove 97 machined in the inner diameter of the powder hopper upper housing 35 with the seal longitudinal axis coincident with the canister axis 46 (FIG. 5).

The seal body section 95 has a bottom surface 99 and an inner diameter 101.

Integral with the body section 95 is a first lip 103. The first lip 103 is partially defined by an inner frusto-conical surface 105 and an outer frusto-conical surface 107. The inner frusto-conical surface 105 intersects the body section inner diameter 101. The outer frusto-conical surface 107 intersects the bottom surface 99 of the body section 95. The first lip is further defined by a top plane 109 that is coincident with the bottom surface 99 of the body section and a bottom surface 111 that is generally parallel to the top plane 109. The surfaces 99 and 111 may be generally perpendicular to the seal longitudinal axis.

The seal 63 further comprises a second lip 113. The second lip 113 is partially defined by an inner frusto-conical surface 115 that is a continuation of the inner frusto-conical surface 105 of the first lip 103. The second lip is further defined by an outer frusto-conical surface 117, a top plane 119, and a bottom surface 121. The outer frusto-conical surface 117 lies between the frusto-conical surfaces 115 and 107. The top plane 119 is coincident with the bottom surface 111 of the first lip 103. The second lip bottom surface 121 preferably is slightly angled so as to form a frusto-conical surface having its apex along the centerline 46 and on the same side of the powder carrier wheel 47 as the top surface 61 thereof.

Figure 1:
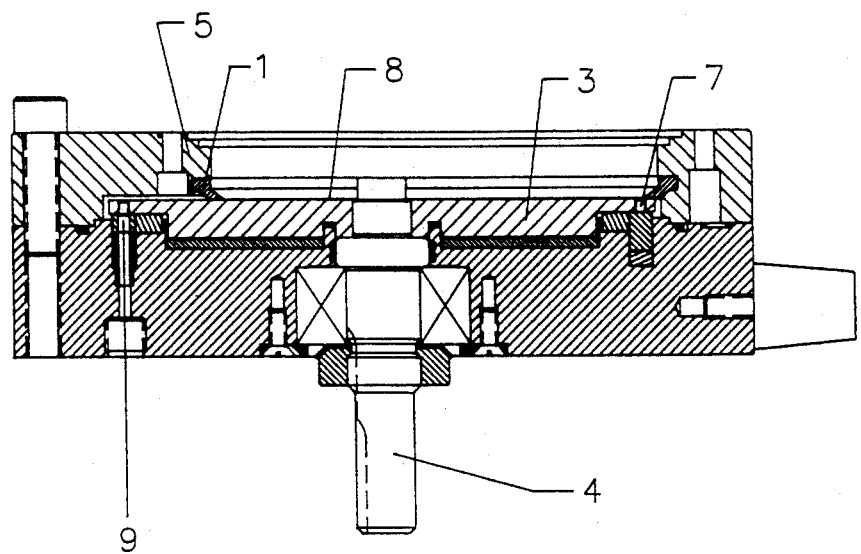
FIG. 1 is a cross sectional view of a portion of a prior powder hopper.
Figure 4:
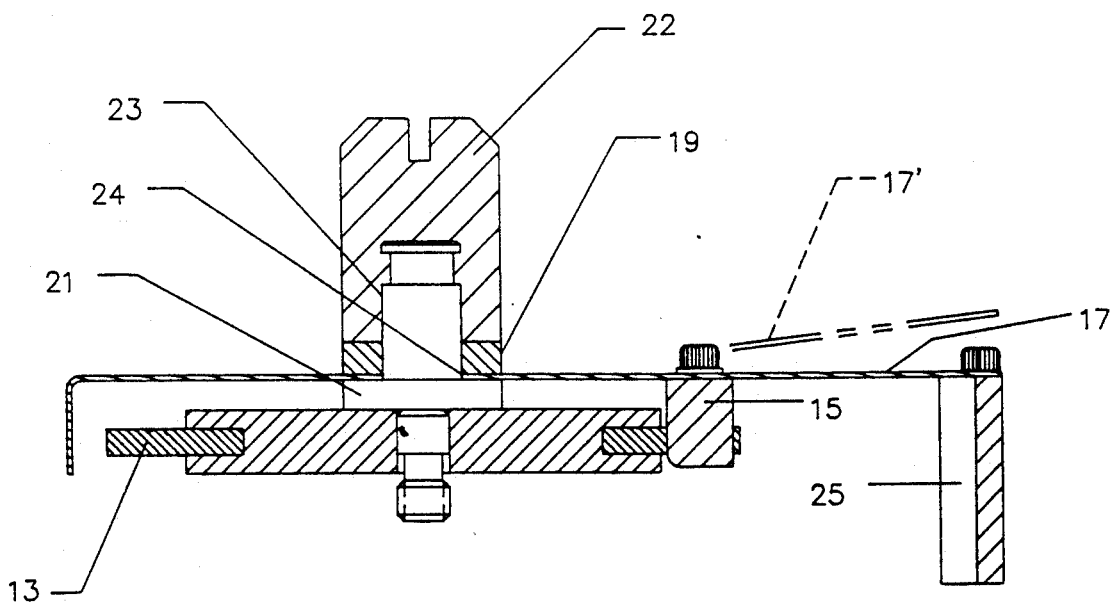
FIG. 4 is a cross sectional view taken along lines 4—4 of FIG. 3.
Figure 2:
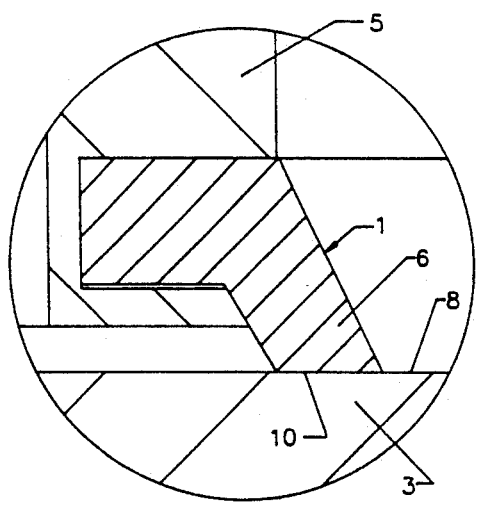
FIG. 2 is an enlarged cross sectional view of a prior seal used with the powder hopper of FIG. 1.
Figure 7:
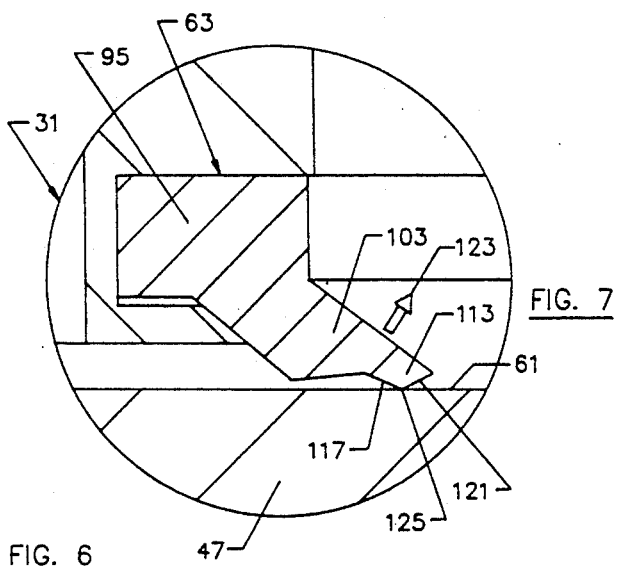
FIG. 7 is an enlarged cross sectional view of the seal of the present invention installed in a powder hopper with a single circular line of contact between the seal and a powder carrier wheel.

In FIG. 7, the seal 63 is shown in an operating configuration, with the powder carrier wheel 47 assembled into the hopper 31. In the operating configuration, the seal is pressed against the powder carrier wheel top surface 61 such that the lips 103 and 113 deflect in the direction of arrow 123 relative to the body section 95. The dimensions of the pertinent components of the hopper such as the bearing 43, shaft 45, powder carrier wheel 47, lower housing 39, and upper housing 35 (FIG. 5) are chosen such that the lip deflections cause a circular line contact to be created at reference numeral 125 between the powder carrier wheel top surface and the junction of the second lip outer frusto-conical surface 117 with the second lip bottom surface 121. With the press at the circular line of contact 125, abrasive particles in the canister 33 are much less likely to pass between the seal and the powder carrier wheel surface 61 than with the plane contact of prior seals. Consequently, the service life of the seal 63 is increased by as much as ten times over the service lives of prior seals.

Figure 8:
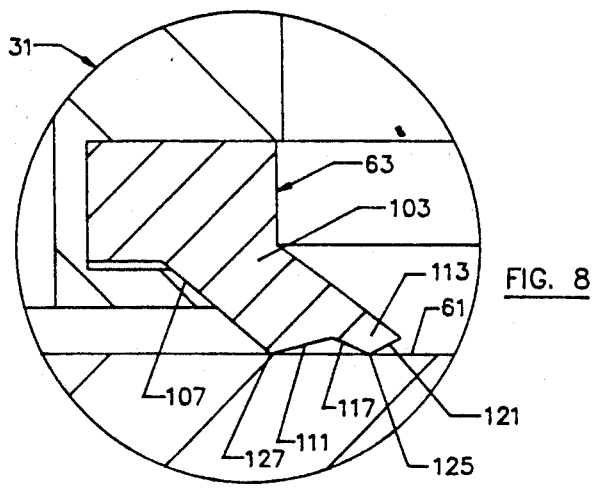
FIG. 8 is a view similar to FIG. 7 but showing the lip seal with a double circular line contact with a powder carrier wheel.

It is a feature of the present invention that the seal 63 may have a double circular line contact with the powder carrier wheel 47. For that purpose, the powder carrier wheel is installed within the hopper 31 in a manner that produces additional press on and deflection of the seal lips 103 and 113, FIG. 8. In the configuration of FIG. 8, the seal 63 makes the first circular line contact 125 between the powder carrier wheel top surface 61 and the junction of the bottom surface 121 with the outer frusto-conical surface 117 of the second lip 113. In addition, a second circular line of contact 127 is created between the powder carrier wheel top surface and the seal at the junction of the bottom surface 111 and outer frusto-conical surface 107 of the first lip. The double circular line contacts 125 and 127 provide maximum sealing against powder in the canister 33 from unintentionally entering the powder out port 65 (FIG. 5).

Further in accordance with the present invention, and looking at FIGS. 5, 9, and 10, a cup spring washer 129 is interposed between the thumb screw 81 and the washer 79 of the tamper assembly 67. The cup spring washer 129 is compressed between the thumb screw and the washer 79 each time the leaf spring 78 is deflected by the lift cam 93 to the position 78'. A portion of the total deflection undergone by the leaf spring is caused by compression of the cup spring washer. As a consequence, the amount of bending required by the leaf spring to produce the total deflection 78' is reduced compared with prior designs lacking the cup spring washer. The result is that the bending stress of the leaf spring is significantly reduced. I have found that the service life of the tamper assembly 67 with the cup spring washer is almost four times greater than with prior designs.

Thus, it is apparent that there has been provided, in accordance with the invention, a precision powder hopper that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. A precision powder hopper comprising:
   a. canister means having a longitudinal axis for holding a quantity of particulate matter, the canister means defining a generally crescent shaped passage and a powder out port communicating with the crescent shaped passage;
   b. a powder carrier wheel mounted for rotation within the canister means about a second axis eccentric to the first axis, the powder carrier wheel being formed as a generally circular disk having opposed top and bottom surfaces and defining at least one slot extending therebetween for receiving a predetermined quantity of the particulate material, a portion of the disk being received within the canister means crescent shaped passage;
   c. drive means for rotating the powder carrier wheel to carry the particulate material therein from the canister means to the powder out port; and
   d. an annular seal having a body section with a longitudinal axis and being received in the canister means, a first lip integral with and extending from the body section, and a second lip integral with and extending from the first lip and on the opposite side thereof as the body section, at least one of the first and second lips being pressed against the powder carrier wheel top surface to create a circular line contact therewith,
   so that the seal wipes the particulate material from the top surface of the powder carrier wheel along the circular line contact between the seal and the powder carrier wheel as the powder carrier wheel slot rotates into the canister means crescent shaped passage to thereby prevent unwanted particulate matter from being carried from the canister means to the powder out port.

2. The precision powder hopper of claim 1 further comprising a tamper assembly comprising:
   a. spoke means for rotating with the powder carrier wheel;
   b. a washer carried for rotation on the spoke means;
   c. spring means retained on the spoke means and interposed between the spoke means and the washer for periodically being bent about the spoke means to deflect a predetermined amount in response to rotation of the spoke means;
   d. screw means for capturing the spring means and washer onto the spoke means; and
   e. a cup spring washer interposed between the screw means and the washer for being compressed therebetween in unison with the deflection of the spring means to thereby reduce the bending of the spring means and extend the spring means service life.

3. The precision powder hopper of claim 1 wherein:
   a. the seal body section has an inner diameter, an outer diameter, and a bottom surface;
   b. the seal first lip is defined by an inner frusto-conical surface that intersects the body section inner diameter, an outer frusto-conical surface that intersects the body section bottom surface, a top plane that is coincident with the body section bottom surface, and a bottom surface; and
   c. the seal second lip is defined by an inner frusto-conical surface that is coincident with the inner frusto-conical surface of the first lip, and an outer frusto-conical surface that intersects the bottom surface of the first lip, a top plane that is coincident with the first lip bottom surface, and a bottom surface, the bottom surface and the outer frusto-conical surface of the second lip intersecting in a circular line that forms the circular line contact between the seal and the powder carrier wheel top surface.

4. The precision powder hopper of claim 3 wherein the first lip bottom surface and the first lip outer frusto-conical surface intersect in a circular line that is pressed against the powder carrier wheel top surface to form a second circular line contact between the lip seal and the powder carrier wheel top surface.

5. The precision powder hopper of claim 3 wherein the inner and outer frusto-conical surfaces of the second lip are parallel.

6. The precision powder hopper of claim 3 wherein the inner and outer frusto-conical surfaces of the first lip are parallel.

7. The precision powder hopper of claim 3 wherein the bottom surface of the second lip is formed as a frusto-conical surface having an apex, the powder carrier wheel top surface lying between the apex of the second lip bottom surface and the powder carrier wheel bottom surface.

8. A seal for wiping particulate material from a selected surface comprising:
   a. an annular body section having an inner diameter, an outer diameter, and a bottom surface;
   b. a first annular lip integral with the body section and having a top plane that is coincident with the bottom surface of the body section, a bottom surface, an inner frusto-conical surface that intersects the body section inner diameter, and an outer frusto-conical surface that intersects the body section bottom surface; and
   c. a second lip integral with the first lip and having a top plane that is coincident with the first lip bottom surface, an inner frusto-conical surface, an outer frusto-conical surface, and a bottom surface, the intersection between the bottom surface and the outer frusto-conical surface of the second lip forming a circular line that is contactable with the selected surface to wipe the particulate material therefrom.

9. The seal of claim 8 wherein the intersection of the outer frustro-conical surface and the bottom surface of the first lip is contactable with the selected surface to create a second circular line of contact therewith.

10. The seal of claim 8 wherein the inner and outer frusto-conical surfaces of the first lip are parallel.

11. The seal of claim 8 wherein the bottom surface of the second lip is formed as a frusto-conical surface.

12. In combination with a powder hopper having a slotted rotatable carrier wheel for carrying small amounts of a powder from a supply thereof to a powder out port, apparatus for tamping the powder into the carrier wheel slot comprising:
 a. a spoked wheel mounted for rotation with the carrier wheel;
 b. a washer assembled to the spoked wheel;
 c. a leaf spring sandwiched between the washer and the spoked wheel for bending relative thereto;
 d. cam means joined to the leaf spring for cyclically deflecting the leaf spring a predetermined amount in response to rotation of the spoked wheel;
 e. a tamper bar mounted to the leaf spring for tamping powder into the carrier wheel slot in response to the cyclical deflections of the leaf spring;
 f. screw means for capturing the washer and the leaf spring on the spoked wheel; and
 g. a cupped spring washer interposed between the screw means and the washer for being compressed therebetween in unison with the predetermined deflections of the leaf spring by the cam means to reduce the bending of the leaf spring while enabling the leaf spring to undergo the predetermined deflections and thereby reduce the leaf spring bending stress.

* * * * *